US006679472B2

(12) United States Patent
Baugh

(10) Patent No.: US 6,679,472 B2
(45) Date of Patent: Jan. 20, 2004

(54) PRESSURE BALANCED CHOKE AND KILL CONNECTOR

(76) Inventor: Benton F. Baugh, 14626 Oak Bend, Houston, TX (US) 77079

( * ) Notice: Subject to any disclaimer, the term of this patent is extended or adjusted under 35 U.S.C. 154(b) by 148 days.

(21) Appl. No.: 10/053,856

(22) Filed: Jan. 24, 2002

(65) Prior Publication Data

US 2003/0136927 A1 Jul. 24, 2003

(51) Int. Cl.[7] ........ F16K 3/00
(52) U.S. Cl. ........ 251/62; 251/326; 166/86.3
(58) Field of Search ........ 251/62, 63–63.6, 251/326; 166/85.4, 86.3, 368

(56) References Cited

U.S. PATENT DOCUMENTS 3,268,241 A * 8/1966 Castor et al. ........ 166/368
4,401,164 A 8/1983 Baugh
4,516,795 A 5/1985 Baugh
4,585,207 A * 4/1986 Shelton ........ 251/62
5,494,078 A * 2/1996 Schulte ........ 137/630.14
5,823,224 A * 10/1998 Gomez ........ 137/240
6,293,344 B1 * 9/2001 Nixon et al. ........ 166/363
6,470,975 B1 * 10/2002 Bourgoyne et al. ........ 175/57

* cited by examiner

*Primary Examiner*—Joseph A. Kaufman

(57) ABSTRACT

A choke or kill line connector for a subsea blowout preventer stack which is slide member operated to provide pressure balanced design to eliminate the potentially high forces associated with connectors which do not have the complication of a locking connector and provide integral valving capability to allow for testing and to retain drilling mud in the choke or kill lines upon disconnection.

21 Claims, 7 Drawing Sheets

PRESSURE BALANCED CHOKE AND KILL CONNECTOR

BACKGROUND OF THE INVENTION

Deepwater blowout preventer systems are major pieces of capital equipment landed on the ocean floor in order to provide pressure protection while drilling holes deep into the earth for the production of oil and gas. The typical blowout preventer stacks have an 18-¾" bore and are usually of 10,000 psi working pressure. The blowout preventer stack assembly weighs in the range of five to eight hundred thousand pounds. It is typically divided into a lower blowout preventer stack and a lower marine riser package.

The lower blowout preventer stack includes a connector for connecting to the wellhead at the bottom and several individual ram type blowout preventer assemblies, which will close on various pipe sizes and in some cases, will close on an open hole with what is called blind rams. Characteristically there is an annular preventer at the top, which will close on any pipe size or close on the open hole.

The lower marine riser package typically includes a connector at the bottom for connecting to the lower blowout preventer stack, a single angular preventer for closing off on any piece of pipe or the open hole, a flex joint, and a connection to a riser pipe which extends to the surface to the drilling vessel.

The purpose of the separation between the lower blowout preventer stack and the lower marine riser package is that the annular blowout preventer on the lower marine riser package is the preferred assembly to be used. When it is used and either has a failure or is worn out, it can be released and retrieved to the surface for servicing while the lower blowout preventer stack maintains pressure competency on the wellhead. The riser pipe going to the surface is typically a 21" O.D. pipe with a bore larger than the bore of the blowout preventer stack. It is a low pressure pipe and will control the mud flow which is coming from the well up to the rig floor, but will not contain the 10,000–15,000 psi that the blowout preventer stack will contain. Whenever the high pressures must be communicated back to the surface for well control procedures, smaller pipes on each side of the drilling riser, called the choke line and the kill lines provide this function. These will typically have the same working pressure as the blowout preventer stack and rather than have an 18-¾-20" bore, they will have a 3–4" bore.

These pipes come down on each side of the drilling riser, go past flex joints, to an area on each side of the connector connecting the lowering riser package to the lower blowout preventer stack. At this point they are connected to pipes which go down the lower blowout preventer stack and enter the bore of the lower blowout preventer stack, near the bottom of the blowout preventer stack. One of these lines is called the choke line, and has a general job description of allowing high pressure well fluids to flow up across chokes during the well control operations. The line on the opposite side is typically called the kill line and it is attached below the lowest blowout preventer ram and has a general job description of communicating a heavy fluid to be pumped down into the well to kill the well. Killing the well means that the pressure in the formation is high enough to overcome the pressure head of the fluid in the bore. Killing the well is placing heavy enough fluid in the well bore to overcome the formation pressures. When the lower marine riser package is disconnected from the lower blowout preventer stack, the choke and kill lines must be disconnected. There are typically two types of connectors for this application, a passive connector and an active connector. The passive connector is typically a straight stab and would typically have a seal O.D. of about 4-½". As the stab is on about a 5 ft. radius from the centerline of the blowout preventer stack, if one of these units is pressured to 10,000 psi it exerts a force of approximately 160,000 lbs. on the blowout preventer stack or puts a moment of approximately 800,000 ft. lbs moment on the blowout preventer stack connector. This is a substantial force to be withstood and requires a redesign and reinforcement of the blowout preventer stack to accommodate these high forces.

The connector type choke and kill connector literally engages a small connector similar to the one that is on the centerline of the blowout preventer stack. By having an actual connector on the choke or kill connector the pressure force is taken within the connector and eliminates the destructive moment forces on the blowout preventer stack frame. A problem can occur in this design in that when the connector must be released in an emergency situation such as when the vessel has lost control and is being driven off location on the surface, the connector may not release. If the connector does not release in a drive off situation, the unit will be torn in half causing substantial damage to the blowout preventer stack, making it expensive and difficult to recover. Literally if a connector does not release and the blowout preventer stack is released, the recovery and repair is a multi-million dollar repair operation. An additional problem with conventional choke and kill connectors is that the choke and the kill lines are a pipe as long as 12,000 feet back to the surface, full of expensive drilling mud. When the open marine riser is released and the connector is released, the entire column of mud is spilled onto the ocean floor, representing not only a high cost but pollution potential. The conventional solution to this is the addition of a high pressure failsafe gate valve on the choke line and the kill line, along with additional required control functions for the valve.

SUMMARY OF THE INVENTION

The object of this invention is to provide a connector which is a passive connector which does not lock onto the lower mandrel, but also does not provide a separation force to be sustained by the blowout preventer guide frame and lower marine riser hydraulic connector.

A second object of the present invention is to provide a means for integral valving to retain the drilling mud in the choke and kill lines.

A third object of the present invention is to provide redundant re-energizeable sealing.

Another object of the present invention is to provide a connector which is tolerant of real-world manufacturing and installation conditions.

DESCRIPTION OF THE PREFERRED EMBODIMENT

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 1:
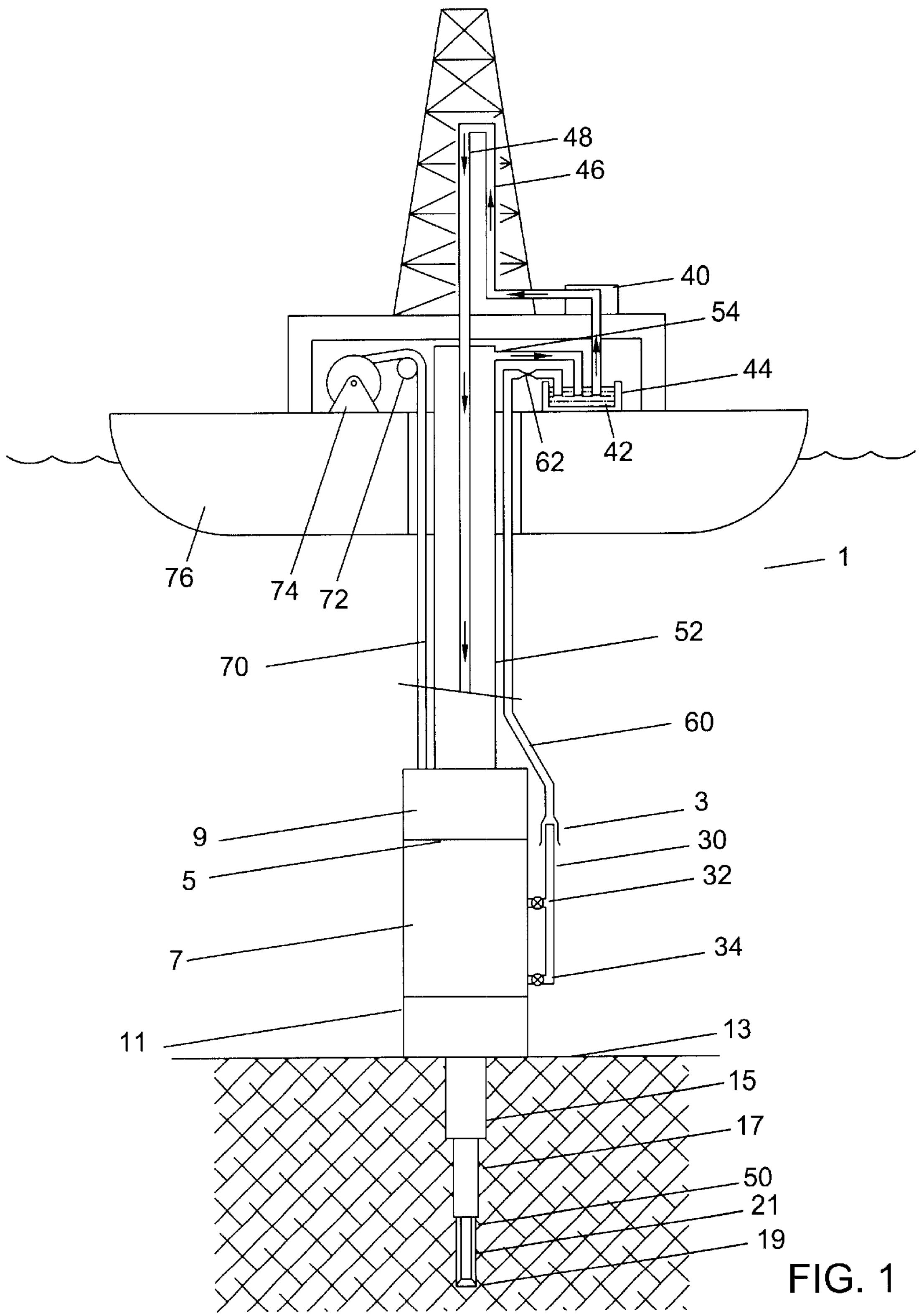
FIG. 1 is a view of a complete system for drilling subsea wells.

Referring now to FIG. 1, a view of a complete system for drilling subsea wells 1 is shown in order to illustrate the utility of the present invention. The C&K connector 3 is shown at approximately the same elevation as the interface 5 between the lower Blowout Preventer stack 7 and the lower marine riser package 9. The lower marine riser package 9 sits generally on a subsea wellhead system 11, which in turn is landed on the ocean floor 13.

Below the subsea wellhead system 11, it can be seen that a hole was drilled for a first casing string, that string 15 was landed and cemented in place, a hole drill thru the first string for a second string, the second string 17 cemented in place, and a hole is being drilled for a third casing string by drill bit 19 on drill string 21.

The lower Blowout Preventer stack generally comprises a lower hydraulic connector for connecting to the subsea wellhead system 11, usually 4 or 5 ram style Blowout Preventers, an annular preventer, and an upper mandrel for connection by the connector on the lower marine riser package.

The C&K connector 3 is on a vertical pipe 30 which is generally illustrative of a choke or a kill line. Typically the kill line will enter the bore of the Blowout Preventers below the lowest ram and has the general function of pumping heavy fluid in the well to overburden the pressure in the bore or to "kill" the pressure. The general implication of this is that the heavier mud will not be circulated, but rather forced into the formations. The choke line will typically enter the well bore above the lowest ram and is generally intended to allow circulation to circulate heavier mud into the well to regain pressure control of the well. The circulation path will be discussed following. For brevity of space, the line 30 is intended to be exemplary of both the choke and kill lines. Generally a choke valve is indicated at 32 and a kill valve indicated at 34.

Normal drilling circulation is the mud pumps 40 taking drilling mud 42 from tank 44. The drilling mud will be pumped up a standpipe 46 and down the upper end 48 of the drill pipe 21. It will be pumped down the drill pipe 21, out the drill bit 19, up the annular area 50 between the outside of the drill pipe 21 and the bore of the hole being drilled, up the bore of the casing 17, thru the subsea wellhead system 11, the lower Blowout Preventer stack 7, the lower marine riser package 9, up the drilling riser 52, out a bell nipple 54 and back into the mud tank 44.

During situations in which an abnormally high pressure from the formation has entered the well bore, the thin walled drilling riser 52 is typically not able to withstand the pressures involved. Rather than making the wall thickness of the relatively large bore drilling riser thick enough to withstand the pressure, the flow is diverted to a choke line 30. It is more economic to have a relatively thick wall in a small pipe to withstand the higher pressures than to have the proportionately thick wall in the large riser pipe.

When the higher pressures are to be contained, one of the annular or ram Blowout Preventers are closed around the drill pipe and the flow coming up the annular area around the drill pipe is diverted out thru choke valve 30 into the pipe 30. The flow passes up thru C&K connector 3, up pipe 60 which is attached to the outer diameter of the riser 52, thru choking means illustrated at 62, and back into the mud tanks.

The connector illustrated in the figure is a passive stab connector and as discussed previously, it is simply a stab sub which produces a separation force upon pressuring which is a function of the seal diameter and the pressure. It in turn produces a moment on the structures and lower marine riser connector which is a function of the force and the distance from the centerline of the lower marine riser connector. The connector of this invention will be discussed in further detail in the figures which follow.

On the opposite side of the drilling riser 52 is shown a cable or hose 70 coming across a sheave 72 from a reel 74 on the vessel 76. The cable 70 is shown characteristically entering the top of the lower marine riser package. These cables typically carry hydraulic, electrical, multiplex electrical, or fiber optic signals. Typically there are at least 2 of these systems, which are characteristically painted yellow and blue. As the cables or hoses 70 enter the top of the lower marine riser package 9, they typically enter the top of control pod to deliver their supply or signals. When hydraulic supply is delivered, a series of accumulators are located on the lower marine riser package 9 or the lower Blowout Preventer stack 7 to store hydraulic fluid under pressure until needed.

Figure 2:
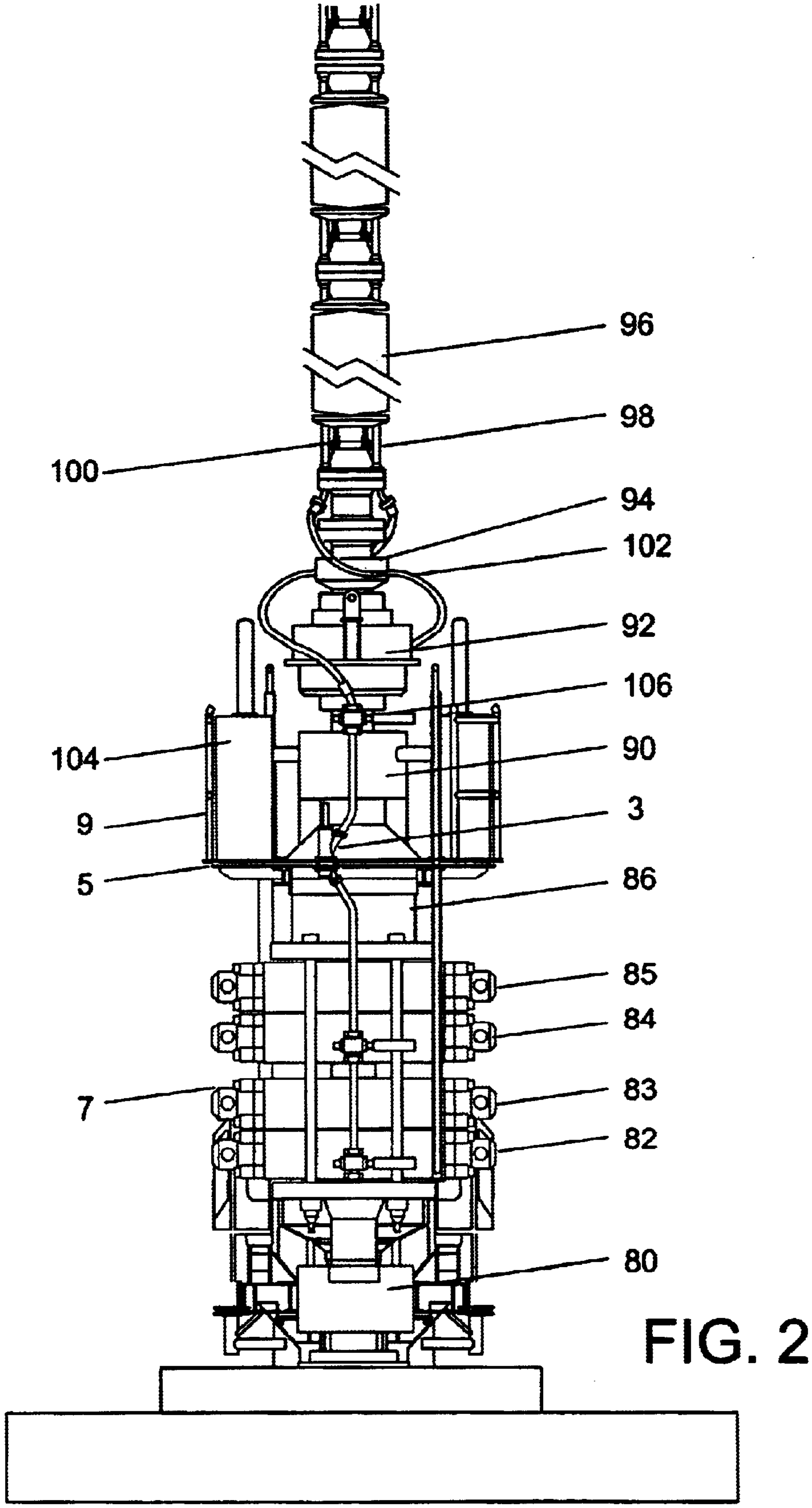
FIG. 2 is a closer view of a subsea blowout preventer stack showing the installation of a connector of this invention.

Referring now to FIG. 2, a closer view of a subsea blowout preventer stack shows the installation of a connector of this invention. The C&K connector 3 is shown at the interface 5 between the lower marine riser package 9 and the lower Blowout Preventer stack 7.

The lower Blowout Preventer stack 7 shows the lower hydraulic connector 80, four ram Blowout Preventers 82–85, and an annular Blowout Preventer 86. The lower marine riser package 9 shows a hydraulic connector 90 for engaging a mandrel on the lower Blowout Preventer stack, an annular Blowout Preventer 92, a flex joint 94, drilling riser section 96, choke line 98, kill line 100, choke or kill line flex pipe 102 and control pod 104. Valve 106 is a remotely controlled failsafe gate valve which conventionally has the job of being closed to allow testing of the choke or the kill line during running as joints are added, and to save the mud in the choke or the kill line after disconnection. This valve which is required by alternate connectors is eliminated by the connector of this invention.

Figure 3:
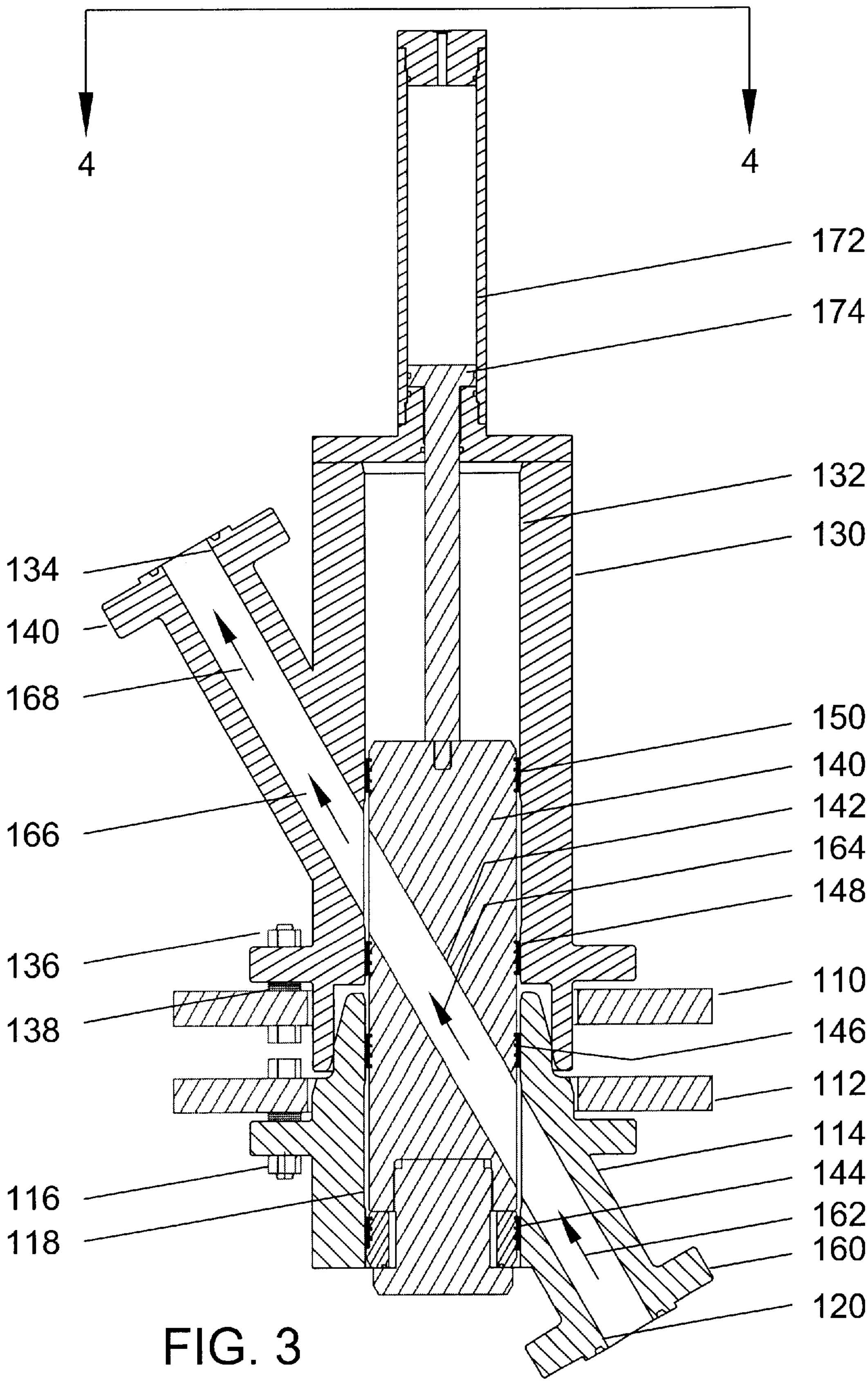
FIG. 3 is a cross section view of a connector of this invention in the operating condition.

Referring now to FIG. 3, cross section view of a connector of this invention is shown in the operating condition. Plate 110 is the lower structural plate of the lower marine riser package and plate 112 is the upper structural plate of the lower Blowout Preventer stack. Mandrel 114 is bolted to plate 112 with bolts 116, has a central bore 118 and an outlet bore 120 at an angle with respect to the central bore 118. In the case of the illustration the angle is 30°.

Upper body 130 has a central bore 132 which is generally aligned with central bore 118 and an outlet bore 134 at an angle to the central bore 132. The upper body 130 is bolted to plate 110 with bolts 136. Shims 138 are provided to give angular alignment adjustment capability for upper body 130 with respect to mandrel 114.

Slide member 140 is provided with a flow path 142 at an angle such that it communicates the bore 120 with the bore 134. Slide member 140 has seals 144, 146, 148, and 150 such that seals 144 and 146 seal the interface between flow path 142 and bore 120 and seals 148 and 150 seal the interface between flow path 142 and bore 134. As seals 144 and 146 are circular, concentric, and of the same seal diameter, they do not provide an axial force but rather are pressure balanced. In the same manner, as seals 148 and 150 are circular, concentric, and of the same seal diameter, they do not provide an axial force but rather are pressure balanced.

As can be seen in the figure, flow enters the flange 160; flows along the path of arrows 162, 164, 166, and 168; and then flows out of flange 170. Cylinder 172 at the top of the assembly along with piston 174 hold the slide member 140 in the correct position for communication.

Figure 4:
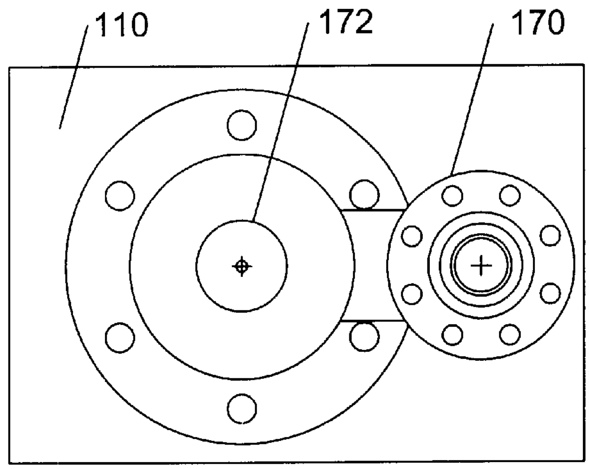
FIG. 4 is a top view of the connector of this invention.

Referring now to FIG. 4, a top view of the connector of this invention is shown landed on plate 110.

Figure 5:
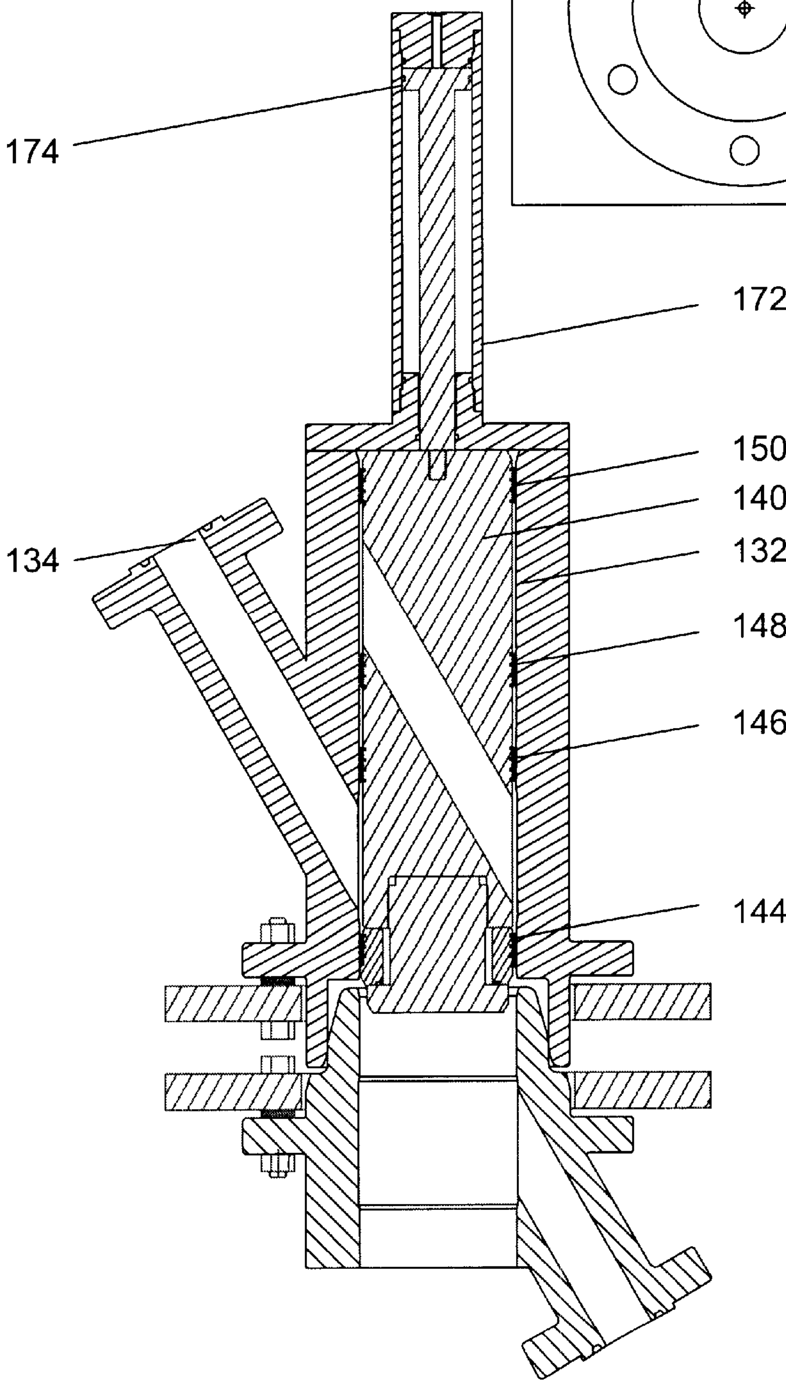
FIG. 5 is a cross section view of the connector of this invention with the valving closed.

Referring now to FIG. 5, a cross section view is shown of the connector of this invention with the valving closed. Seals 144 and 146 are in approximately the same position as seals 148 and 150 were in FIG. 3, causing both ends of the flow path 142 to be sealed against central bore 132. The effect of this is that the flow into or out of bore 134 is sealed off, with the slide member 140 acting as a shutoff valve.

Figure 6:
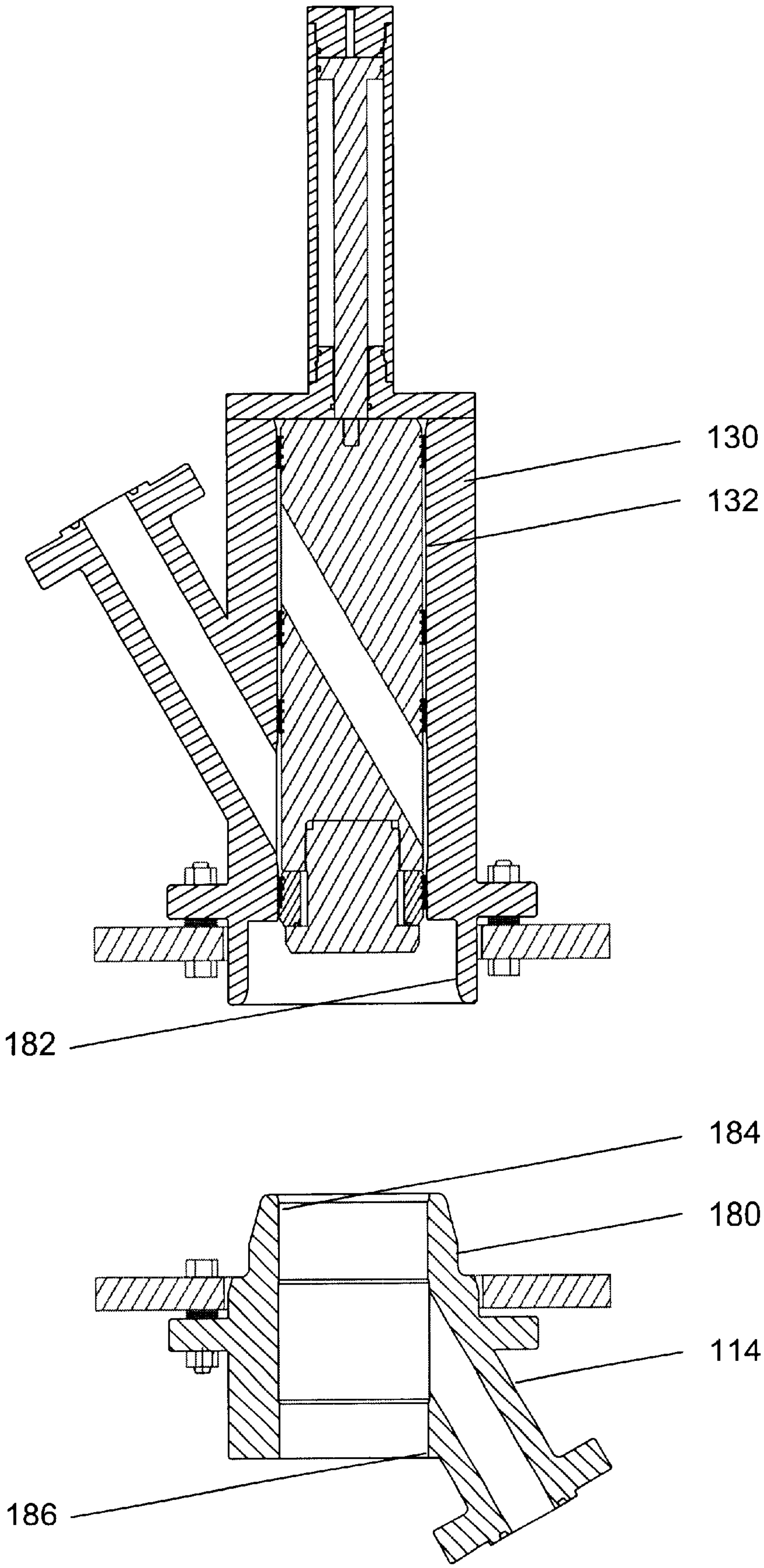
FIG. 6 is a cross section view of the connector of this invention with the valving closed and the upper section separated from the lower section.

Referring now to FIG. 6, a cross section view of the connector of this invention with the valving closed and the upper section separated from the lower section as it would be when landing the lower marine riser package on the lower Blowout Preventer stack or removing the lower marine riser package from the lower Blowout Preventer stack. When engaging, the diameter 180 on the mandrel 114 first engages diameter 182 of upper body 130 to provide concentricity alignment between the mandrel and the upper body. This diametrical engagement ensures that the diameter indicated at 184 which will be sealed by seals 146 is closely aligned with the bore 132 of the upper body 130. Seal area 186 of mandrel 114 is further from the engagement of the aligning diameters 180 and 182 and is therefore more subject to angular misalignment.

Figure 7:
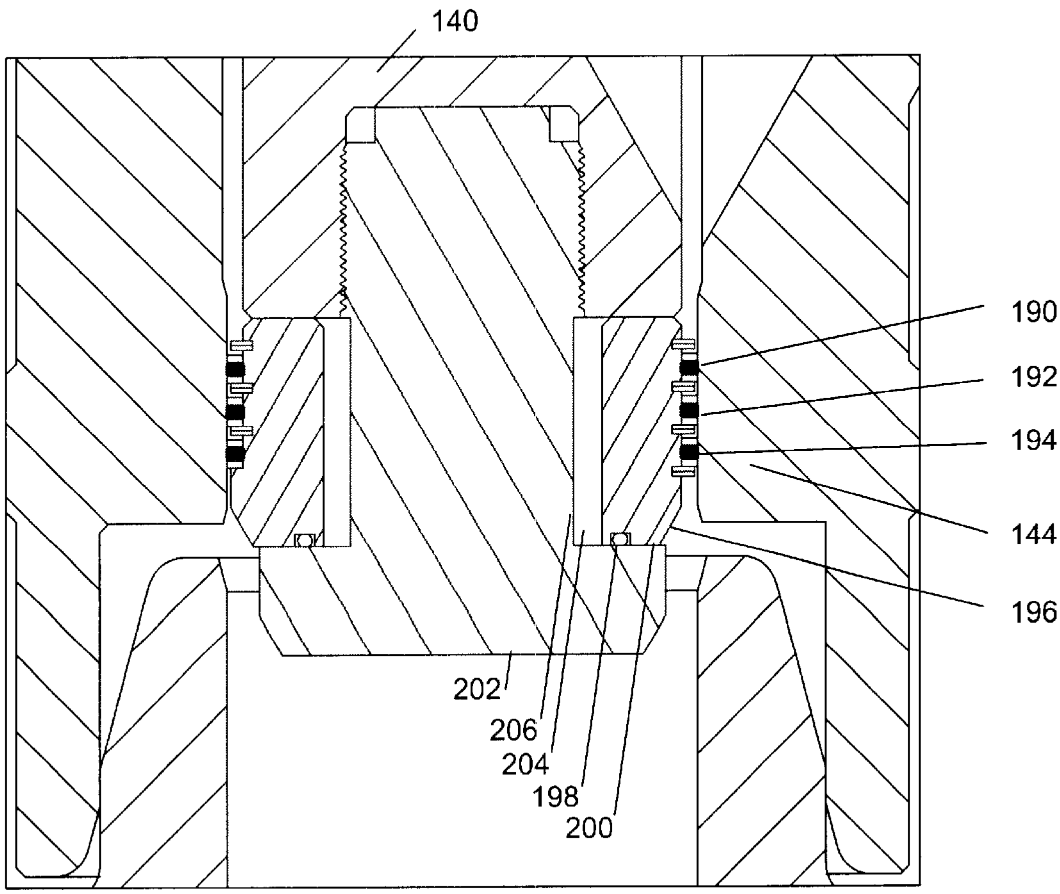
FIG. 7 is a close-up cross section of the lower end of the internal valving of this invention showing the angular misalignment capability.

Referring now to FIG. 7, a close up cross section of the lower end of the internal valving of this invention is shown with the angular misalignment compensation capability. Seal 144 is actually made up of triple seals 190, 192, and 194 on ring 196. The seals are preferably of a resilient compound for ease of reliable sealing against a straight bore, and are preferably of a metal seal to prevent blowing off when the slide member is opened with pressure in the bore. Ring 196 is fitted with an additional face seal 198 which engages a flat face 200 on retainer 202. Retainer 202 is a portion of slide member 140 which is releasably attached to the lower end. Gap 204 around diameter 206 allows the ring 196 to float radially to compensate for angular misalignment of the central bore 118 with the bore 132 and still remain in a sealing relationship with the other parts of slide member 140.

Figure 8:
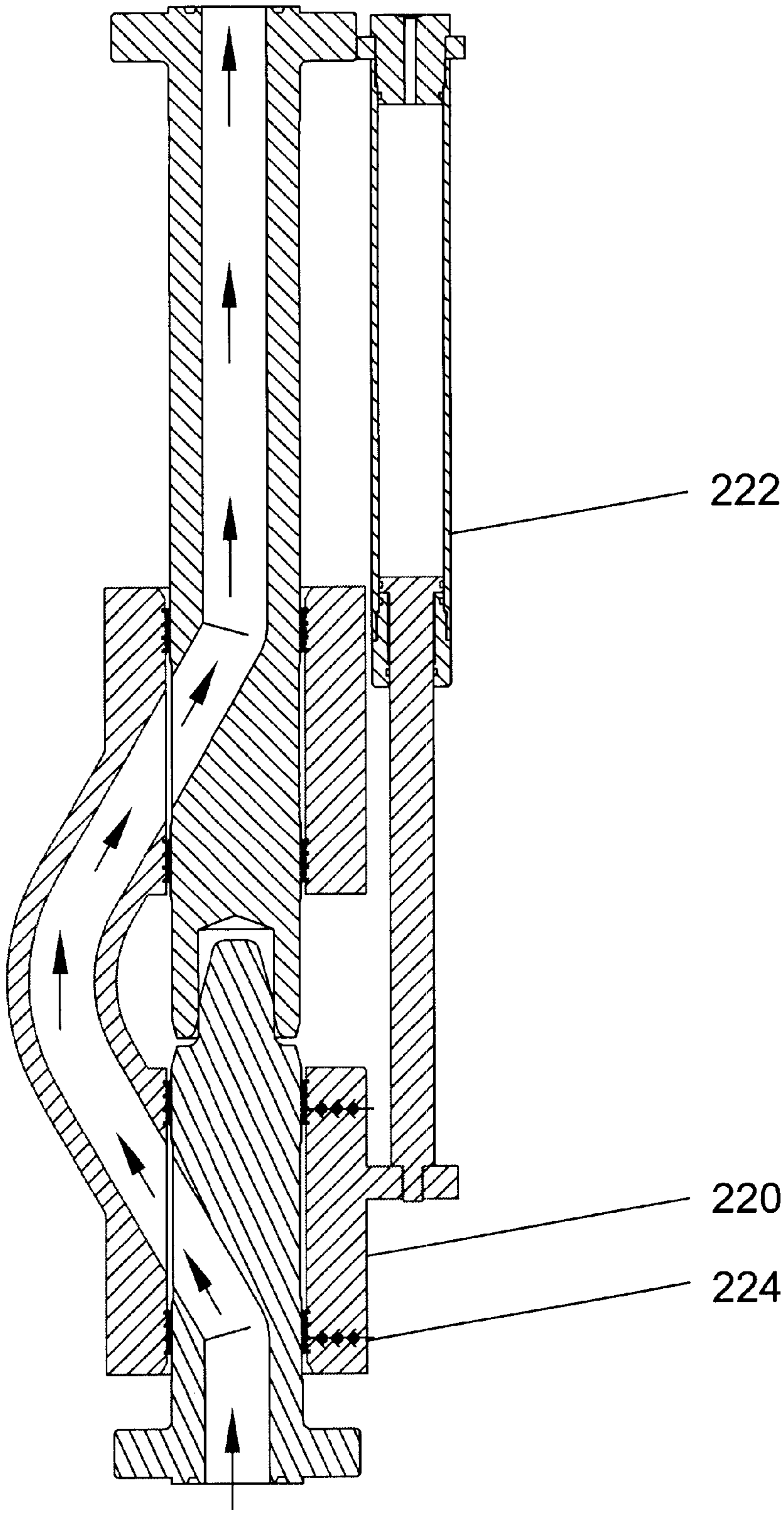
FIG. 8 is a cross section view of an alternate embodiment of the connector.

Referring now to FIG. 8, a reversal of parts is shown with the slide member 220 being the outer cylindrical member rather than the inner bar type member. The flow path is curved to allow the bar type upper and lower members to be fluidly connected. The cylinder 222 would be two cylinders on each side of the assembly. Multiple check valves are shown at 224 to indicate that sealant can be injected into the space between the multiple seals in case full sealing is not obtained naturally. In deep water operations, the sealant can be injected by a remotely operated vehicle (ROV). The same ports can be used as test ports when the unit is first engaged.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A connector for fluid connection between the upper and lower portions of a subsea blowout preventer stack comprising:

a slide member having
- an upper position and a lower position,
- first, second, third, and fourth seal areas,
- a first port between said first and second seal areas,
- a second port between said third and fourth seal areas, and
- said first and said second ports being in fluid communication;

a lower member
- suitable for fixing to said lower portion of said subsea blowout preventer stack
- having 2 seal areas of approximately the same pressure area size, and
- with a first flow passageway from the central portion of said lower member to an inlet on said lower member;

an upper member
- suitable for fixing to said upper portion of said subsea blowout preventer stack
- having 2 seal areas of approximately the same pressure area size, and
- with a second flow passageway from the central portion of said upper member to an outlet on said upper member;

such that in said lower position of said slide member said first port of said slide member aligns with said first flow passageway of said lower member and said second port of said slide member aligns with said second flow passageway of said upper member to allow fluid communication between the inlet of said lower member and the outlet of said upper member.

2. The invention of claim 1 further such that in said upper position of said slide member said first port of said slide member is between said first and second seals areas and said first, second, third and fourth seal areas sealingly engage said upper member sealing said second flow passageway against fluid flow.

3. The invention of claim 1, wherein said first, second, third, and fourth seal areas are of the same diameter such that pressure between said seals will not cause an axial force or movement.

4. The invention of claim 1, wherein said inlet and said outlet are connected to choke or kill line lines on said subsea blowout preventer stack.

5. The invention of claim 1, wherein said first and said second ports of said slide member are on opposite sides of said slide member and said fluid communication is generally in a straight line.

6. The invention of claim 1, wherein said first and said second ports of said slide member are on the same side of said slide member and said fluid communication flows along a curved path in between said two ports.

7. The invention of claim 1, wherein said inlet and said outlet are angled with respect to the centerline of said slide member.

8. The invention of claim 1, wherein one of said seals is capable of radially floating with respect to the centerline of said slide member to allow for angular mismatch between said lower member and said upper member.

9. The invention of claim 8, wherein said one of said seals is mounted on a ring mounted around a portion of said slide member.

10. The invention of claim 9 wherein and interface between said ring and said slide member is a flat plane perpendicular to a centerline thru said slide member and a seal is provided to seal between said ring and said slide member at said interface.

11. The invention of claim 1, wherein aligning surfaces on said lower member and said upper member engage for alignment prior to said slide member being moved into engagement with said lower member.

12. The invention of claim 11 wherein angular adjustment mechanisms are provided to axially align said lower member with said upper member prior to engagement of said slide member.

13. The invention of claim 1, wherein resilient seals are provided which are bonded to metal rings to provide the easy sealing characteristics of resilient seals along with the resistance to loss of metal when the slide member is moved while there is pressure in said ports.

14. The invention of claim 1, wherein multiple redundant resilient seals are provided which are bonded to metal rings to provide the easy sealing characteristics of resilient seals along with the resistance to loss of metal when the slide member is moved while there is pressure in said ports, such that if one seal is damaged on a release of pressure additional seals will be available for sealing.

15. The invention of claim 1, wherein porting is provided to allow the injection of sealants to re-energize said seals.

16. The invention of claim 15, wherein said porting is provided with one or more check valves to prevent leakage from between seals to the environment.

17. The invention of claim 16, wherein said porting is provided with a receptacle to allow the injection of sealant by a remotely operated vehicle.

18. The invention of claim 1, wherein said slide member is moved between said first and said second positions by a hydraulic pressure in a cylinder.

19. A pressure balanced connector for fluid connection between the upper and lower portions of a subsea blowout preventer stack comprising:

- a slide member having
  - an upper position and a lower position,
  - first, second, third, and fourth seal areas,
  - a first port between said first and second seal areas,
  - a second port between said third and fourth seal areas, and
  - said first and said second ports being in fluid communication;
- a lower member
  - suitable for fixing to said lower portion of said subsea blowout preventer stack
  - having 2 seal areas of approximately the same bore size, and
  - with a first flow passageway from the central portion of said lower member to an inlet on said lower member;
- an upper member
  - suitable for fixing to said upper portion of said subsea blowout preventer stack
  - having 2 seal areas of approximately the same bore size, and
  - with a second flow passageway from the central portion of said upper member to an outlet on said upper member;
- such that in said lower position of said slide member said first port of said slide member aligns with said first flow passageway of said lower member and said second port of said slide member aligns with said second flow passageway of said upper member to allow fluid communication between the inlet of said lower member and the outlet of said upper member, and
- further such that in said upper position of said slide member said first port of said slide member is between said first and second seals areas and said first, second, third and fourth seal areas sealingly engage said upper member sealing said second flow passageway against fluid flow.

20. The invention of claim 19, wherein said first and said second ports of said slide member are on opposite sides of said slide member and said fluid communication is generally in a straight line.

21. The invention of claim 19, wherein said first and said second ports of said slide member are on the same side of said slide member and said fluid communication flows along a curved path in between said two ports.

* * * * *